(12) United States Patent
Subramanian et al.

(10) Patent No.: US 8,981,951 B2
(45) Date of Patent: Mar. 17, 2015

(54) METHOD OF MONITORING THE GRADING MARGIN BETWEEN TIME-CURRENT CHARACTERISTICS OF INTELLIGENT ELECTRONIC DEVICES

(75) Inventors: Sankara Subramanian, Stafford (GB); Simon Richards, Abbots Bromley (GB); Alan Wixon, Stafford (GB)

(73) Assignees: Alstom Technology Ltd, Baden (CH); Schneider Electric Energy UK Ltd, Telford (GB)

( * ) Notice: Subject to any disclaimer, the term of this patent is extended or adjusted under 35 U.S.C. 154(b) by 471 days.

(21) Appl. No.: 13/504,482

(22) PCT Filed: Nov. 5, 2009

(86) PCT No.: PCT/EP2009/064672
§ 371 (c)(1),
(2), (4) Date: Apr. 26, 2012

(87) PCT Pub. No.: WO2011/054385
PCT Pub. Date: May 12, 2011

(65) Prior Publication Data
US 2012/0212348 A1    Aug. 23, 2012

(51) Int. Cl.
*G08B 21/00* (2006.01)
*H02H 7/30* (2006.01)
*H02H 3/00* (2006.01)

(52) U.S. Cl.
CPC . *H02H 7/30* (2013.01); *H02H 3/006* (2013.01)
USPC ................................ 340/638; 361/63; 361/64

(58) Field of Classification Search
USPC .............. 340/638; 361/63, 64; 714/25, 30, 31
See application file for complete search history.

(56) References Cited

U.S. PATENT DOCUMENTS

| 3,952,944 | A | * | 4/1976 | Koyanagi et al. | ................ 377/16 |
| 4,752,886 | A | * | 6/1988 | Gareis | ........................... 700/293 |
| 4,761,606 | A | | 8/1988 | Germer et al. | |
| 5,311,392 | A | * | 5/1994 | Kinney et al. | ................. 361/93.2 |
| 5,831,428 | A | * | 11/1998 | Pyle et al. | ..................... 324/142 |

(Continued)

FOREIGN PATENT DOCUMENTS

| EP | 0300075 A1 | 1/1989 |
| EP | 1845383 A2 | 10/2007 |

(Continued)

OTHER PUBLICATIONS

Sachdev, M. et al., "An Adaptive Relaying System for a Power Distribution Network," TENCON, IEEE Region 10 International Conference on EC3-Energy, Computer, Communication and Control Systems, vol. 1, Aug. 28, 1991, pp. 472-477.

(Continued)

*Primary Examiner* — Jennifer Mehmood
*Assistant Examiner* — Rufus Point
(74) *Attorney, Agent, or Firm* — Nixon Peabody LLP

(57) ABSTRACT

A method of monitoring the grading margin between at least two time-current characteristics of Intelligent Electronic Devices ($IED_A$, $IED_B$) installed in an electrical power system, each Intelligent Electronic Device comprising a counting means, the grading margin comprising a safety margin set by a user, characterized in that it comprises, when a fault occurs which causes a fault current in the electrical power system, a step of providing a warning to the user when the safety margin is infringed upon.

6 Claims, 2 Drawing Sheets

(56) References Cited

U.S. PATENT DOCUMENTS

| | | |
|---|---|---|
| 6,751,767 B1 | 6/2004 | Toumiya |
| 6,949,921 B1 * | 9/2005 | Feight et al. ............... 324/127 |
| 6,954,704 B2 | 10/2005 | Minami et al. |
| 7,301,738 B2 * | 11/2007 | Pearlman et al. ............ 361/42 |
| 7,532,955 B2 * | 5/2009 | Dougherty ................. 700/286 |
| 7,626,791 B2 * | 12/2009 | Newman et al. ............. 361/63 |
| 8,213,144 B2 * | 7/2012 | Papallo et al. .............. 361/63 |
| 2002/0053911 A1 | 5/2002 | Saitoh |
| 2003/0234642 A1 | 12/2003 | Clegg et al. |
| 2005/0083616 A1 * | 4/2005 | Reid et al. .................. 361/42 |
| 2005/0140352 A1 | 6/2005 | Allain et al. |
| 2005/0223290 A1 * | 10/2005 | Berbaum et al. ............. 714/30 |
| 2006/0020857 A1 * | 1/2006 | Miller et al. ................ 714/30 |
| 2008/0065270 A1 | 3/2008 | Kasztenny et al. |
| 2009/0174425 A1 | 7/2009 | Kang |
| 2009/0257157 A1 | 10/2009 | Vicente et al. |
| 2010/0153036 A1 | 6/2010 | Elwarry et al. |
| 2011/0241654 A1 | 10/2011 | Richards |

FOREIGN PATENT DOCUMENTS

| | | |
|---|---|---|
| EP | 1939996 A2 | 7/2008 |
| FR | 2835319 A1 | 8/2003 |

OTHER PUBLICATIONS

International Search Report and Written Opinion in PCT Application No. PCT/EP2009/064672, mailed Jun. 30, 2010.

Zhang, J. et. al., "A New Method to Realize the Relay Protection of AOCT Following IEC61850," International Conference on Power System Technology, IEEE, Oct. 2006, pp. 1-5.

International Search Report and Written Opinion in International Application No. PCT/EP2008/063547, mailed Aug. 10, 2009.

Office Action for U.S. Appl. No. 13/123,505 dated Sep. 9, 2013.

Office Action for U.S. Appl. No. 13/123,505 dated Mar. 20, 2014.

Notice of Allowance for U.S. Appl. No. 13/123,505 dated Feb. 3, 2015.

* cited by examiner

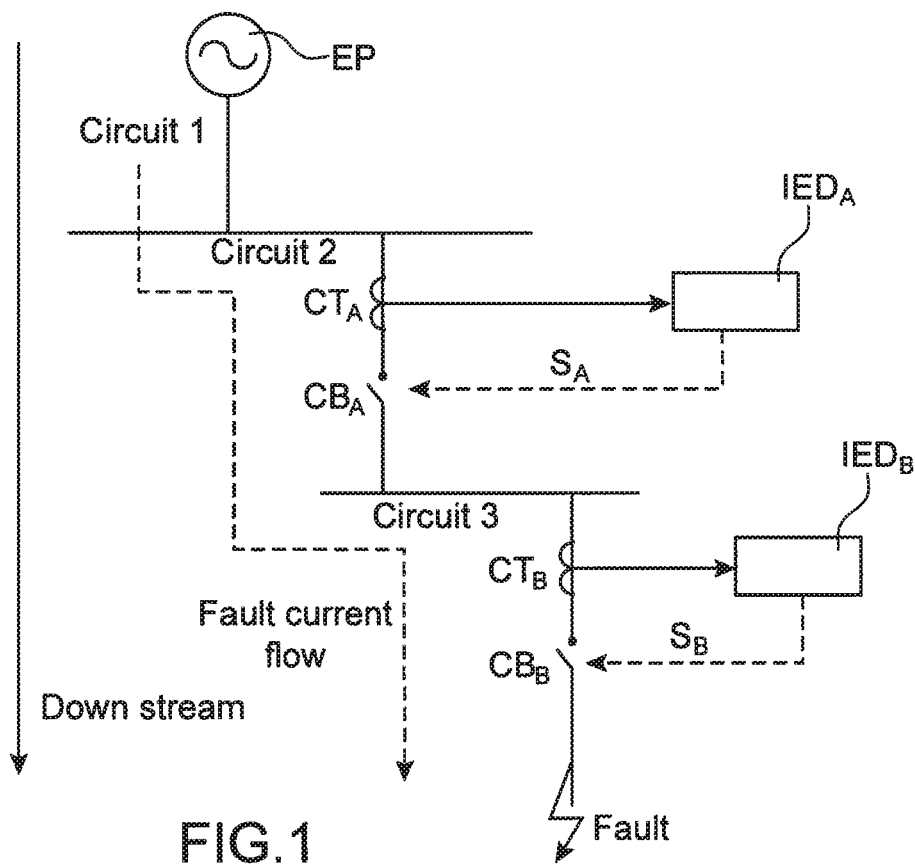
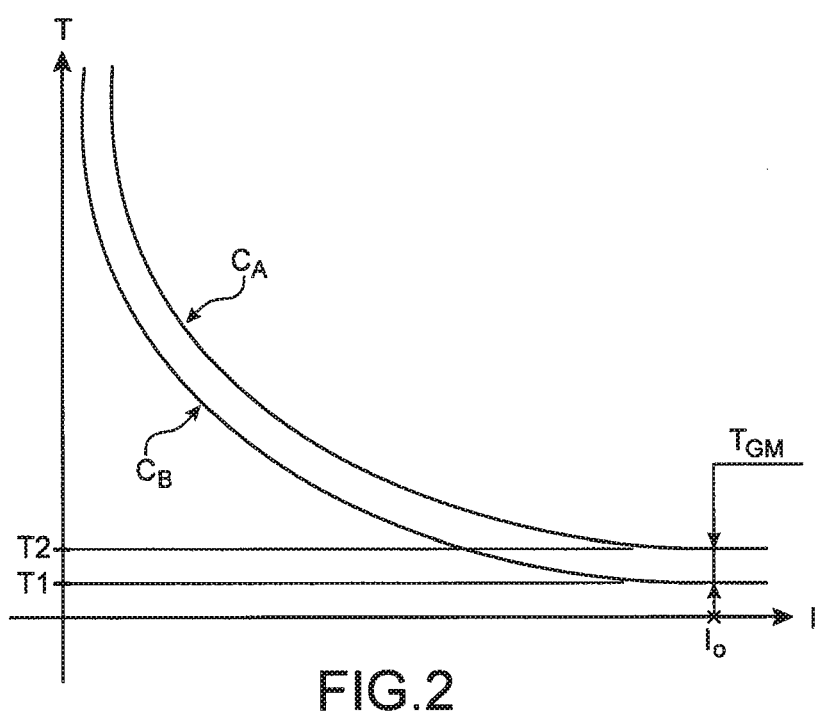

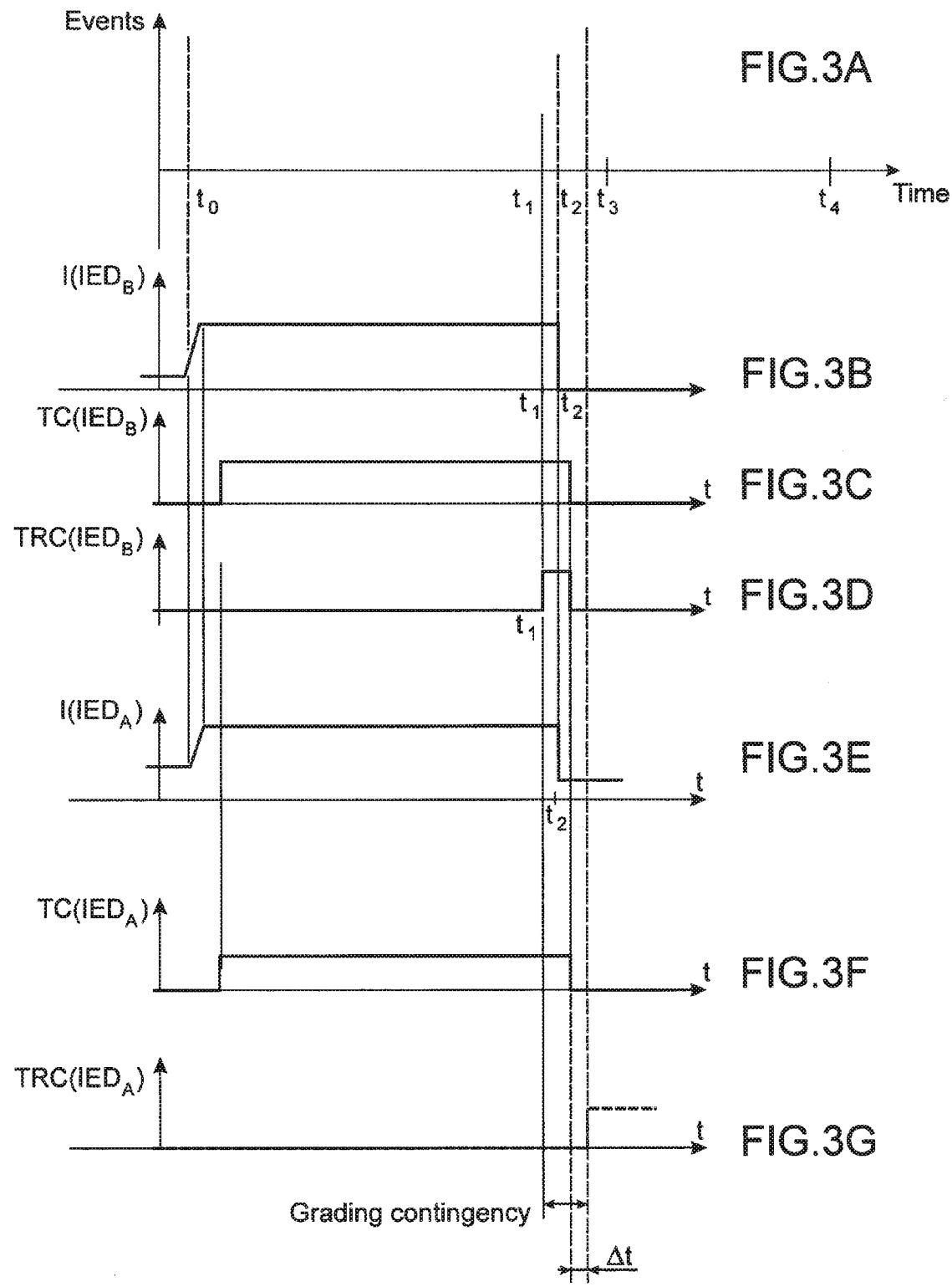

METHOD OF MONITORING THE GRADING MARGIN BETWEEN TIME-CURRENT CHARACTERISTICS OF INTELLIGENT ELECTRONIC DEVICES

CROSS REFERENCE TO RELATED APPLICATIONS OR PRIORITY CLAIM

This application is a National Phase of PCT/EP2009/064672, filed Nov. 5, 2009, entitled, "METHOD OF MONITORING THE GRADING MARGIN BETWEEN TIME-CURRENT CHARACTERISTICS OF INTELLIGENT ELECTRONIC DEVICES", the contents of which are incorporated herein by reference in their entirety.

TECHNICAL FIELD AND PRIOR ART OF THE INVENTION

The invention relates to a method of monitoring the grading margin between time-current characteristics of Intelligent Electronic Devices (IEDs).

Intelligent Electronic Devices (IEDs) are installed in electrical power systems, typically in an electricity generation, transmission, distribution, industrial or transport system. The IEDs are sited in electrical substations, and their purpose is to measure, protect, control and monitor the system to which they are connected. The topic of this application refers to IEDs which protect the power system (often termed "protection relays").

When a fault occurs in a power system the protection IED functions in conjunction with a circuit breaker to interrupt the electricity supply to a faulted circuit, rendering that circuit "dead", and no longer subject to infeed electrical energy. In short, the IED issues a trip command to the circuit breaker, and the circuit breaker then trips to clear the fault.

In many systems the method of detection of a fault is by means of over current, and it is important that multiple IEDs on the system coordinate with each other in performing the system protection task. Only the supply to the faulted circuit should be "tripped", with adjacent or upstream healthy circuits being unaffected.

A typical means to implement this coordination works such that the time for an IED to issue its trip command depends on the magnitude of fault current flowing. This can be arranged in a power system such that when a fault occurs, the IED closest to the fault operates first and opens the circuit breaker to clear the fault. In such cases, the IEDs further away from the faults ("upstream") are not supposed to operate, and are deliberately slowed down by the addition of a "grading margin" when they measure the same level of fault current.

FIG. 1 shows a simplistic system topology showing the concept of an upstream and downstream IED and FIG. 2 shows curves illustrating the grading margin of the circuit of FIG. 1.

FIG. 1 shows an electrical power source EP (circuit 1) supplying two electrical circuits in series referenced circuit 2 and circuit 3. An upstream Intelligent Electronic Device $IED_A$ of circuit 2 is energized from a current transformer $CT_A$ belonging to circuit 2 and a downstream Intelligent Electronic Device $IED_B$ of circuit 3 is energized from a current transformer $CT_B$ belonging to circuit 3. Intelligent Electronic Devices $IED_A$ and $IED_B$ respectively measure the current flowing in circuit 2 and the current flowing in circuit 3. The Intelligent Electronic Device $IED_A$ outputs a control signal $S_A$ which is applied to a circuit breaker $CB_A$ of circuit 2 and the Intelligent Electronic Device $IED_B$ outputs a control signal $S_B$ which is applied to a circuit breaker $CB_B$ of circuit 3. Circuit breakers $CB_A$ and $CB_B$ are intended to interrupt a fault current if necessary.

FIG. 2 shows curves illustrating the time-current characteristics of $IED_A$ and $IED_B$. The curve $C_A$ is the time-current characteristic of $IED_A$ and the curve $C_B$ is the time-current characteristic of $IED_B$. For low currents, the operating time T of the over current element in an IED is high and, for large currents, the operating time of the over current element in an IED is small. Thus the operating time T is inversely proportional to the current I measured by the IED.

The two curves $C_A$ and $C_B$ are separated so that, for a same value of current $I_o$, there are two different values T1 and T2 of the operating time T. The value T1 corresponds to the curve $C_B$ and the value T2 corresponds to the curve $C_A$. The value of T2 is greater than the value of T1 and the difference between T2 and T1 is, by definition, the grading margin $T_{GM}$ which depends on the current I.

Beyond the duration T1 enabling the downstream Intelligent Electronic Device $IED_B$ to operate first, the grading margin time $T_{GM}$ includes tolerance errors in the operating time of both Intelligent Electronic Devices $IED_A$ and $IED_B$, calculation over shoot time of the upstream Intelligent Electronic Device $IED_A$, tolerance errors in the input current transformers which feed both the $IED_A$ and the $IED_B$ the input current signals to measure, and a safety margin for contingency. The grading margin time $T_{GM}$ is included in the current-time characteristics by the user.

Time dependent over current protection IEDs have an occasional problem of mal-operation for high current faults in a power system which in most cases is identified to the infringement of the grading margin time. Even though the power system protection engineers calculate grading margins taking into consideration what he/she feels are worst case scenarios, it may not be always possible to establish correct grading.

Solutions like "Pre-trip alarms" are so far only available for slow operating time elements, such as thermal protection functions, where techniques are available to calculate the time remaining before a trip, and raise an alarm if this falls below a set threshold. This solution is available across most of the manufacturers of IEDs. In these slow operating time devices (operating in minutes, rather than the fractions of a second typical in over current protection IEDs), the alarms are raised in real time, allowing remedial actions to be taken in the power system before the IED operates. Such solutions are not available for fast operating time elements.

The method of the invention does not have the drawbacks of the methods of the prior art.

DESCRIPTION OF THE INVENTION

Indeed, the invention provides a method of monitoring the grading margin between at least two time-current characteristics of Intelligent Electronic Devices ($IED_A$, $IED_B$) installed in an electrical power system, each Intelligent Electronic Device comprising a means to generate the required operating time delay, the grading margin comprising a safety margin set by a user, characterized in that it comprises, when a fault occurs which causes a fault current in the electrical power system, a step of providing a warning to the user when the safety margin is infringed upon.

According to a further feature of the invention, the grading margin may be automatically increased, to restore correct time-grading, should fault clearance operations on the power system indicate the need for it.

According to another further feature of the invention, the automatic increase of the grading margin is restricted to a maximum allowed time-adder.

The means to generate the required operating time delay of each Intelligent Electronic Device is, for example, a trip counter or a unit intended to implement a time integration algorithm, and hereinafter within this document will be referred to as the "counting means", to simplify reading.

So, the invention proposes a method able to check that the safety margin in the grading calculation is not breached. It is therefore possible that, in the event of a fault, all devices respond within the error tolerance ranges that were assumed in the grading calculation. With the method of the invention, there is a precise means, for every system fault occurrence, to check how close the system came to a mal-operation, and hence to allow power systems engineers to decide whether remedial action is necessary.

The method of the invention specifically covers the following:
(1) To provide a warning to a user when the safety margin time is infringed upon;
(2) Optionally, if selected by the user, to perform an automatic grading margin increment based on the warnings raised to restore the correct grading margin at the relay;
(3) To store a record in the upstream relay based on the alarm warning, such that post-fault analysis can determine the source of the problem.

The method of the invention allows personnel advantageously to indicate the grading problem for post-fault investigation. The remedial action is therefore not based specifically to address the present event, but to indicate the problem and allow remedial action to prevent a similar event causing mal-operation in the future.

BRIEF DESCRIPTION OF THE FIGURES

Other characteristics and advantages of the figure will become clearer upon reading preferred embodiments of the invention made in reference to the attached figures among which:

FIG. 1 shows a simplistic system topology showing the concept of upstream and downstream IEDs;

FIG. 2 shows curves illustrating the time-current characteristics of the upstream and downstream IEDs shown in FIG. 1;

FIGS. 3A-3G are time diagrams to explain the working of the invention in relation with the system of FIG. 1.

In all the figures, the same references designate the same elements.

DETAILED DESCRIPTION OF A PREFERRED EMBODIMENT

The invention discussed in this patent makes use of the time-current characteristics of the over current function. FIG. 3A-3G are time diagrams allowing explanation of the working of the invention in relation with the system of FIG. 1:

FIG. 3A shows a time line which corresponds to the successive events which happen;

FIG. 3B shows the current $I(IED_B)$ seen by the Intelligent Electronic Device $IED_B$;

FIG. 3C shows the timer command $TC(IED_B)$ of the Intelligent Electronic Device $IED_B$;

FIG. 3D shows the trip control $TRC(IED_B)$ of the Intelligent Electronic Device $IED_B$;

FIG. 3E shows the current $I(IED_A)$ seen by the Intelligent Electronic Device $IED_A$;

FIG. 3F shows the timer command $TE(IED_A)$ of the Intelligent Electronic Device $IED_A$;

FIG. 3G shows the trip control $TRC(IED_A)$ of the Intelligent Electronic Device $IED_A$.

First, a fault occurs at an instant $t_0$ (cf. FIG. 3A), and the current seen by the Intelligent Electronic Devices $IED_A$ and $IED_B$ increases (cf. FIGS. 3B and 3E). The counting means of each Intelligent Electronic device begins to count (cf. FIGS. 3C and 3F). If the fault persists beyond an instant $t_1$, the counting means of the downstream Intelligent Electronic Device $IED_B$ increments the counting to a predefined target. When the predefined target is reached, a trip is issued by the $IED_B$ (cf. FIG. 3D) so that a command signal is applied to the circuit breaker $CB_B$ and the fault current is interrupted at an instant $t_2$ greater than $t_1$ (cf. FIG. 3B). Then, the Intelligent Electronic Device $IED_B$ is reset (cf. FIGS. 3C and 3D). Concurrently, $IED_A$ is reset (cf. FIGS. 3E and 3F) and the Intelligent Electronic Device $IED_A$ calculates the level of timeout the counting means of the $IED_A$ has attained relative to the trip level. Besides, the $IED_A$ memorises the fault current just prior to the instant when the current drops off. Then a time remaining to trip $\Delta t$, which represents the time remaining for the $IED_A$ to trip, is calculated (cf. FIG. 3G). The time remaining to trip $\Delta t$ is then compared with a settable alarm threshold which is equal to a safety margin of contingency. If the calculated time remaining to trip $\Delta t$ is less than the threshold, an alarm is raised. This alarm indicates to the users that the grading margin time is compromised. The alarm is typically logged as an event, raised on the IED user interface (typically a display screen) and may be communicated to distant personnel via a remote control link. Then, appropriate corrections may be implemented.

The $\Delta t$ calculation and contingency alarm calculation can be performed fast, in real-time, or post-fault. FIG. 3A indicates a more typical example of the calculation and alarm being performed post-fault, such that personnel are not troubled by extra alarms and data immediately at the time when active fault clearance operations are in progress on the power system.

According to an improvement of the invention, it is planned to automatically perform grading margin corrections. It is therefore planned to automatically instigate a time adder to the time-current characteristics of the Intelligence Electronic Device $IED_A$. The definite time DT adder is equal to the required safety margin minus the actual pre-trip time left to trip. The user is provided with a setting to select to add the definite time adder to the IDMT characteristics, in case he/she wishes to offset the effect of an insufficient time resulting again. This adder effectively shifts the whole IDMT curve by a time amount which would restore the required safety margin. The next time around when a similar fault occurs which an upstream IED measures, it is ensured by the time correction that there will not be an infringement into the safety margin or, at least, there will be less likelihood of it. In order to avoid an excessive DT adder value, a Maximum DT adder adjustment setting is advantageously available to limit the automatic increases.

Alternatively, when selected for manual intervention based on the alarm raised (for the time remaining to trip) the user is alerted to re-check the previously calculated grading between IEDs on the system.

The technique used in the present patent is that:
(1) At the instant when the current is removed the technique calculates the fractional counter position (i.e. what fraction of the counter's ultimate target the element has progressed towards tripping);

(2) At the same time the maximum current recorded prior to the instant of reset is also recorded;

Using above (1) and (2), the technique calculates the time left to trip, had the current not been removed by downstream fault clearance;

(3) In the event the time left to trip has infringed into the alarm time (a fast and accurate pre-trip alarm timer is a pre-requisite of this invention) the technique will raise an alarm.

This is a major step forward for the user in warning of possible action that needs to be taken with respect to the grading margin. Such an exact warning, calibrated directly as time, does not exist today. Further, the invention provides a technique which helps in automatically adjusting the grading margin for the user (a new setting for Grading Margin Adjust="Automatic/Manual" is utilised). When selected for "automatic" by the user, the technique instigates a definite time adder to the IDMT Curve (the DT adder would be automatically calculated based on the required safety margin minus actual pre-trip time left). Also when selected for automatic by the user, to avoid an excessive DT adder value, a Maximum DT adder adjustment setting would be available to limit the extent of automatic increases.

The advantage of the solution is that:
1) The user will be able to see exactly what was the time left to trip, had the applied fault current not been removed.
2) The user gets automatic warning if the basis of the time grading between IEDs has been infringed upon, with the time remaining indicating the amount of "contingency" (ie. how close the power system came to an unwanted tripping).
3) Optionally, the invention can automatically carry out Grading Margin corrections for the user.

The invention claimed is:

1. A method of monitoring the grading margin between at least two time-current characteristics of Intelligent Electronic Devices ($IED_A$, $IED_B$) installed in an electrical power system, each Intelligent Electronic Device comprising a counting means, the grading margin comprising a safety margin set by a user, the method comprising, when a fault occurs which causes a fault current in the electrical power system, a step of providing a warning to the user when the safety margin is infringed upon, characterized in that:
when the fault persists beyond a given duration:
the Intelligent Electronic Device ($IED_B$) closest to the fault issues a trip command which increments the counting contains to a predefined target,
when the predefined target is reached, a trip is issued by the Intelligent Electronic Device ($IED_B$) closest to the fault so that the Intelligent Electronic Device closest to the fault outputs a command signal to be applied to a circuit breaker which interrupts the fault current, and
when the fault current is interrupted:
the step of providing a warning to the user comprises the following elementary steps:
an upstream Intelligent Electronic Device ($IED_A$) calculates a level of timeout the counting means it contains has attained, memorizes the fault current just prior to the instant when the fault ent has been interrupted and calculates a time remaining for the upstream Intelligent Electronic Device to trip ($\Delta t$) which is compared with the safety margin, and
a warning is raised if the time remaining for the upstream intelligent Electronic Device to trip ($\Delta t$) is less than the safety margin.

2. Method according to claim 1, wherein the grading margin is automatically increased when a warning is provided to the user.

3. Method according to claim 2, wherein the automatic increase in the grading margin is restricted to a maximum allowed time-adder.

4. Method according to claim 1, wherein the counting means is a trip counter or a unit intended to implement a time integration algorithm.

5. Method according to claim 2, wherein the counting means is a trip counter or a unit intended to implement a time integration algorithm.

6. Method according to claim 3, wherein the counting means is a trip counter or a unit intended to implement a time integration algorithm.

* * * * *